United States Patent
Gibbs et al.

(10) Patent No.: US 9,038,698 B2
(45) Date of Patent: May 26, 2015

(54) QUICK RELEASE SCREEN CLIPS

(71) Applicant: Ply Gem Industries, Inc., Cary, NC (US)

(72) Inventors: Kenton Sy Gibbs, Wirtz, VA (US); Colin David Campbell, Daleville, VA (US)

(73) Assignee: Ply Gem Industries, Inc., Cary, NC (US)

( * ) Notice: Subject to any disclaimer, the term of this patent is extended or adjusted under 35 U.S.C. 154(b) by 0 days.

(21) Appl. No.: 14/133,228

(22) Filed: Dec. 18, 2013

(65) Prior Publication Data
US 2014/0165343 A1    Jun. 19, 2014

Related U.S. Application Data

(60) Provisional application No. 61/738,783, filed on Dec. 18, 2012.

(51) Int. Cl.
*F16B 2/22*    (2006.01)
*F16B 5/06*    (2006.01)
*F16B 5/12*    (2006.01)

(52) U.S. Cl.
CPC .............. *F16B 2/22* (2013.01); *Y10T 24/44744* (2015.01); *Y10T 24/44769* (2015.01); *F16B 5/0635* (2013.01); *F16B 5/123* (2013.01)

(58) Field of Classification Search
CPC ....... E06B 2009/527; E06B 9/52; E06B 3/28; E06B 3/5481; E06B 9/522
USPC ..................... 160/369, 377, 354, 327; 24/458
See application file for complete search history.

(56) References Cited

U.S. PATENT DOCUMENTS

| | | | | |
|---|---|---|---|---|
| 1,436,952 A * | 11/1922 | Finckh | ......................... | 160/375 |
| 1,955,648 A * | 4/1934 | Nickler | ......................... | 292/288 |
| 2,122,130 A * | 6/1938 | Dahnert | ........................ | 292/210 |
| 2,223,883 A * | 12/1940 | Bergeron | ........................ | 292/257 |
| 2,351,570 A * | 6/1944 | Thurman et al. | .............. | 160/228 |
| 2,508,781 A * | 5/1950 | Bailey et al. | .................. | 160/182 |
| 2,519,168 A * | 8/1950 | Arenwald et al. | ............ | 160/369 |
| 2,596,438 A * | 5/1952 | Rollings | ........................ | 160/369 |
| 2,678,842 A * | 5/1954 | Usalis | ............................. | 292/80 |
| 2,718,423 A * | 9/1955 | Eaddy | ............................. | 292/256 |
| 3,063,524 A * | 11/1962 | Kessler | ........................... | 52/476 |
| 3,137,901 A * | 6/1964 | Malachowski et al. | ......... | 52/773 |
| 3,704,563 A * | 12/1972 | Waller | ............................. | 52/455 |
| 5,217,263 A * | 6/1993 | Peterson | ....................... | 292/112 |
| 8,146,647 B1 * | 4/2012 | Hughes et al. | ................ | 160/371 |
| 8,550,140 B2 * | 10/2013 | Kelley | ............................. | 160/90 |

* cited by examiner

*Primary Examiner* — Katherine Mitchell
*Assistant Examiner* — Justin Rephann
(74) *Attorney, Agent, or Firm* — Lathrop & Gage LLP

(57) ABSTRACT

A quick release clip for securing a screen in position in a frame, the clip comprising a main clip body, a first leg extending outwardly from the main clip body and bent relative to a plane of the main body, the first leg for receipt into a groove of the frame. In addition, the quick release clip includes a contact edge, the main clip body opposite the first leg terminating in the contact edge wherein the contact edge is disposed adjacent an edge of the screen applying a force to maintain the screen in position.

6 Claims, 7 Drawing Sheets

QUICK RELEASE SCREEN CLIPS

RELATED APPLICATIONS

This application claims the benefit of priority to U.S. Provisional Application No. 61/738,783 filed Dec. 18, 2012.

TECHNICAL FIELD

The present disclosure relates to clip for use in rapid and easy installation and removal of window screens.

BACKGROUND

Rapid removal and installation of window and door glass panels and screens can be challenging and cumbersome for many homeowners. Many windows and doors utilize spring-loaded locking members for securing screens and glass panels in position that become stuck or frozen over time and can be extremely difficult for a homeowner to operate.

The disclosed spring-loaded clips can be readily removed with minimal exertion on the part of the user and require no special screen frame configuration to be fully functional at maintaining a tight seal of the screen against the frame. Preferably, a plurality of clips would be used to functionally secure the screen in position and maintain a tight seal against the window jamb to prevent intrusion of insects or wind blow debris. Removal of the screen can be accomplished by sliding the screen sideways, depressing the clips on one side, and freeing the screen frame on the other side, then swinging the screen inward.

It is therefore an object of the present invention to provide an alternative to the use of the traditional spring loaded horizontally translating screen locks with a clip that is easy to operate.

SUMMARY

This disclosure relates to a plurality of quick release clips that are symmetrically disposed around the periphery of the screen or glass panel. The clips are spring-loaded when a screen or glass panel is present and are secured at one end to the window jamb and at the opposite end extend to both the interior of the frame of the screen or glass panel and to the side of the frame of the screen or glass penal where they apply pressure to the screen frame or frame of the glass panel. The clips act both as a centering device and as a retention device.

The quick release clips are further preferably positioned so that the force applied to the screen by each clip is opposed by a clip directly opposite the clip whether the clip is disposed horizontally or vertically in the window frame. The quick release clips are preferably constructed of engineered plastic or PVC and are flexible yet sufficiently tough to avoid fatigue failure through repeated application of force to the clips.

The first end of the quick release clip is configured for receipt into the window's frame groove typically used for securing the glazing bead. The second end of the quick release clip for securing a screen or glass panel in position is configured for receipt at the lateral edge of the screen or glass panel as well as the front surface of the screen. The nominally forked configuration of the second end of the quick release clip facilitates the centralized positioning of the screen into the window frame and also allows the clip to apply pressure to not only the front of the screen or glass panel forcing the screen or glass panel into contact with the frame elements but also to the side of the screen so that opposing clips are in effect pushing against one another centering the screen or glass panel into position.

In order to remove the screen or glass panel the user simply applies side pressure to the screen or glass panel. This pressure to the central body counteracts the spring loading of the clip and eliminates the pressure applied to the side of the screen or glass panel as well as the front of the screen. When pressure applied by all of the quick release clips on one side have been removed from the screen or glass panel it can readily be swung inward and replaced or repaired.

Conveniently, the clips are installed in the same groove that is used for glazing beads which retain the glass in a single hung window. Therefore, no fasteners, extra screen features, or extra frame features are required for the retaining clip to function.

These and other advantages of the invention will be further understood and appreciated by those skilled in the art by reference to the following written specification, claims, and appended drawings. The contents of this summary section are provided only as a simplified introduction to the disclosure, and are not intended to be used to limit the scope of the appended claims.

BRIEF DESCRIPTION OF THE DRAWINGS

With reference to the following descriptions, appended claims, and accompanying drawings:

DETAILED DESCRIPTION

Figure 1:
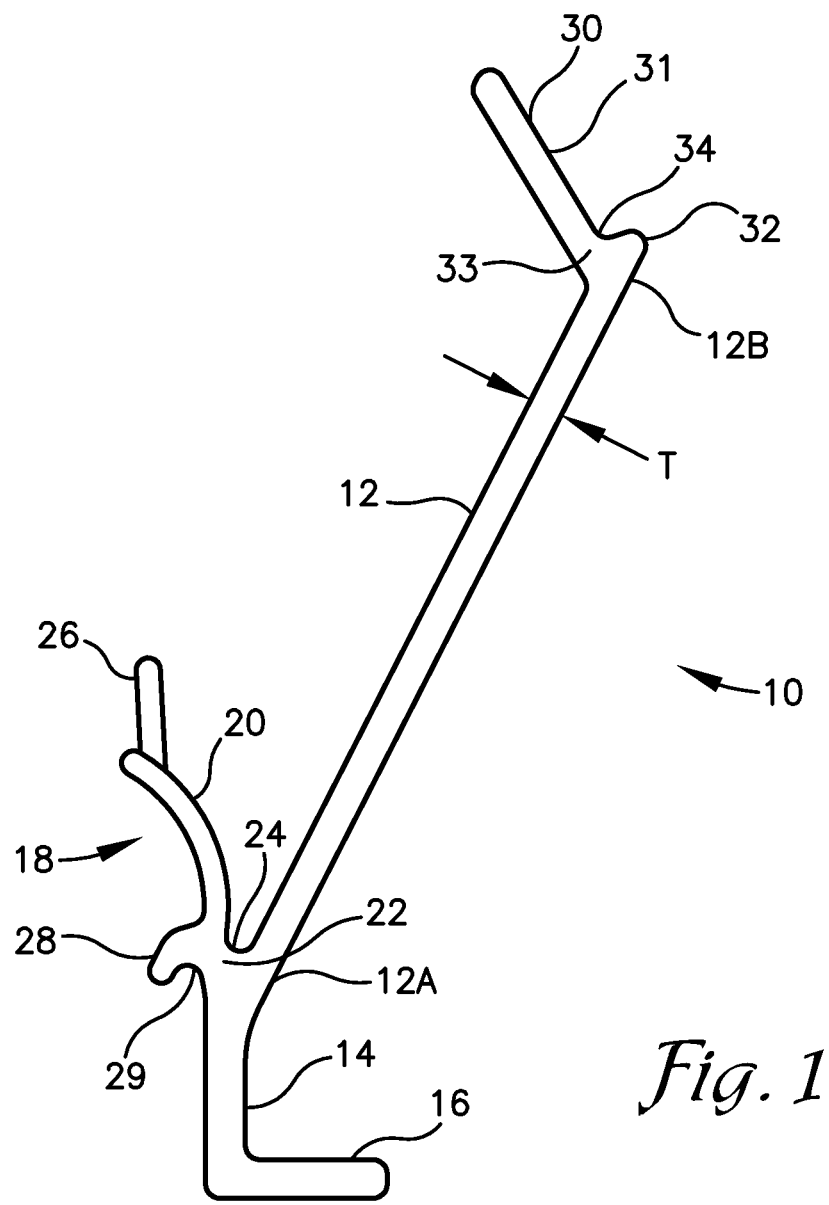
FIG. 1 illustrates an exemplary screen clip in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims. Referring now to the drawings wherein like reference numerals refer to similar or identical parts throughout the several views.

Figure 6:
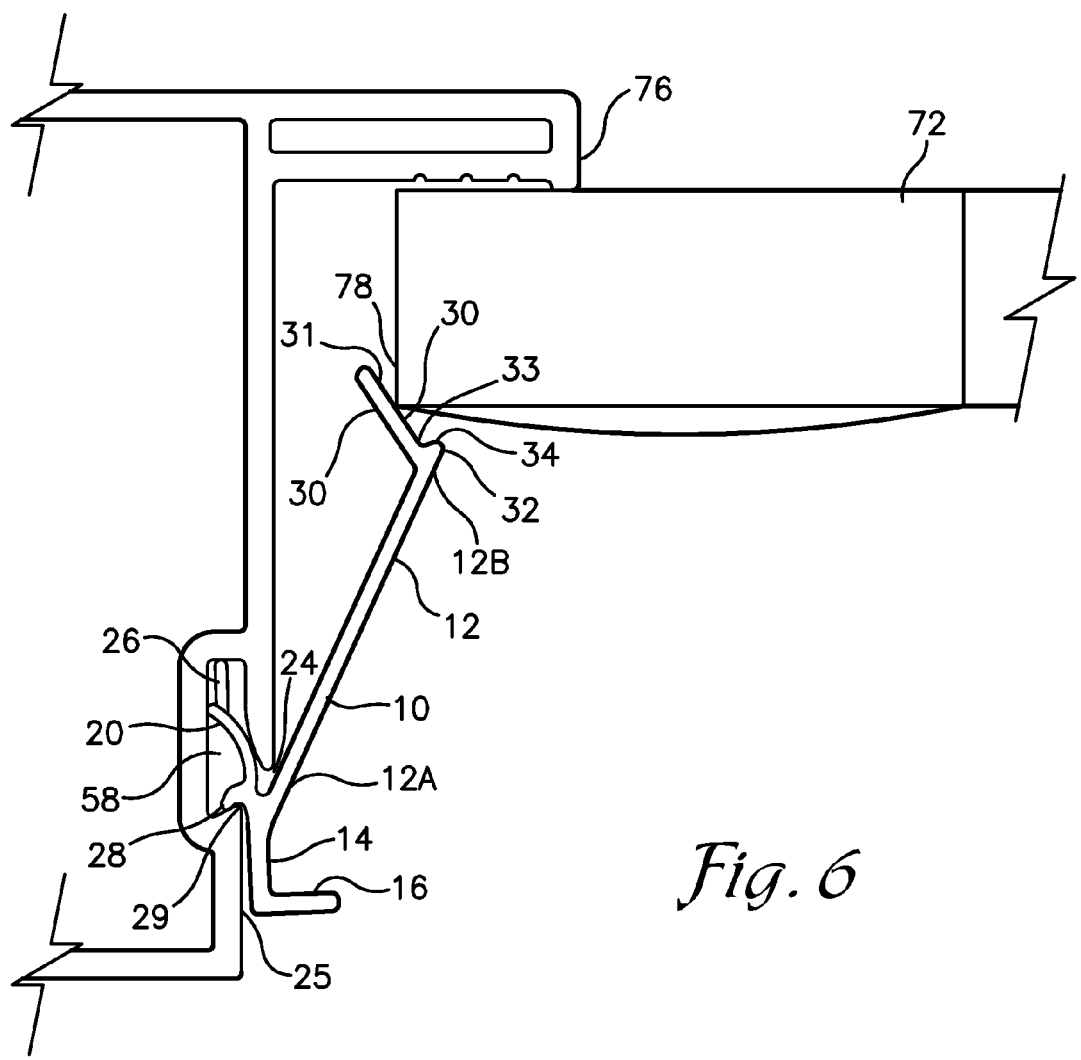
FIG. 6 is a close up view of FIG. 5 revealing more detail on the configuration of an exemplary embodiment of a clip.

FIG. 1 reveals an exemplary embodiment of the quick release clip 10 for securing a screen in position. The quick release clip 10 is comprised of a longitudinally extending body member 12 with a first end 12A and a second end 12B, a leg member 14 extending downwardly from the body member 12 and bent at approximately a 90 degree angle relative to a plane of the leg member 14 is an outwardly extending foot member 16. Extending outwardly from the leg member 14 preferably at an angle in the range of from 30 to 60 degrees is a locking feature 18. The locking feature 18 comprises a complex geometry with an arcuate main portion 20 extending from a junction 22 of the body member 12 and the leg member 14. Also formed at the junction 22 is a junction pocket 24 into which a first edge 25 of the frame groove 58 will set when installed. At the distal end of the arcuate main portion 20 is a linear tab 26. Opposite the linear tab 26 on arcuate main portion 20 and immediately proximate the junction 22 is a hook flange 28. Due to its pronounced curvature, the hook flange 28 forms a flange pocket 29 for engaging a second edge 27 of the frame groove 58 into which the release clip 10 is positioned as best seen in FIG. 6.

Opposite the leg member 14 and also extending from the body member 12 is an arm member 30 with a base 33 that extends outwardly from the main body member 12 at an angle in the range of from about 45 degrees to 75 degrees and preferably at about 60 degrees relative to the plane of the body member 12. The arm member 30 has a front face 31 against which is placed the edge of the screen as seen in 6. At the point where the arm member 30 extends outwardly from the main body member 12 a protrusion 32 and an arm pocket 34.

The quick release clip 10 is preferably fabricated from a flexible yet resilient engineered plastic that can withstand temperature extremes and has exceptional resistance to degradation from ultraviolet light. The quick release clip must be capable of withstanding numerous bending cycles and resistance to fatigue fracture.

Figure 2:
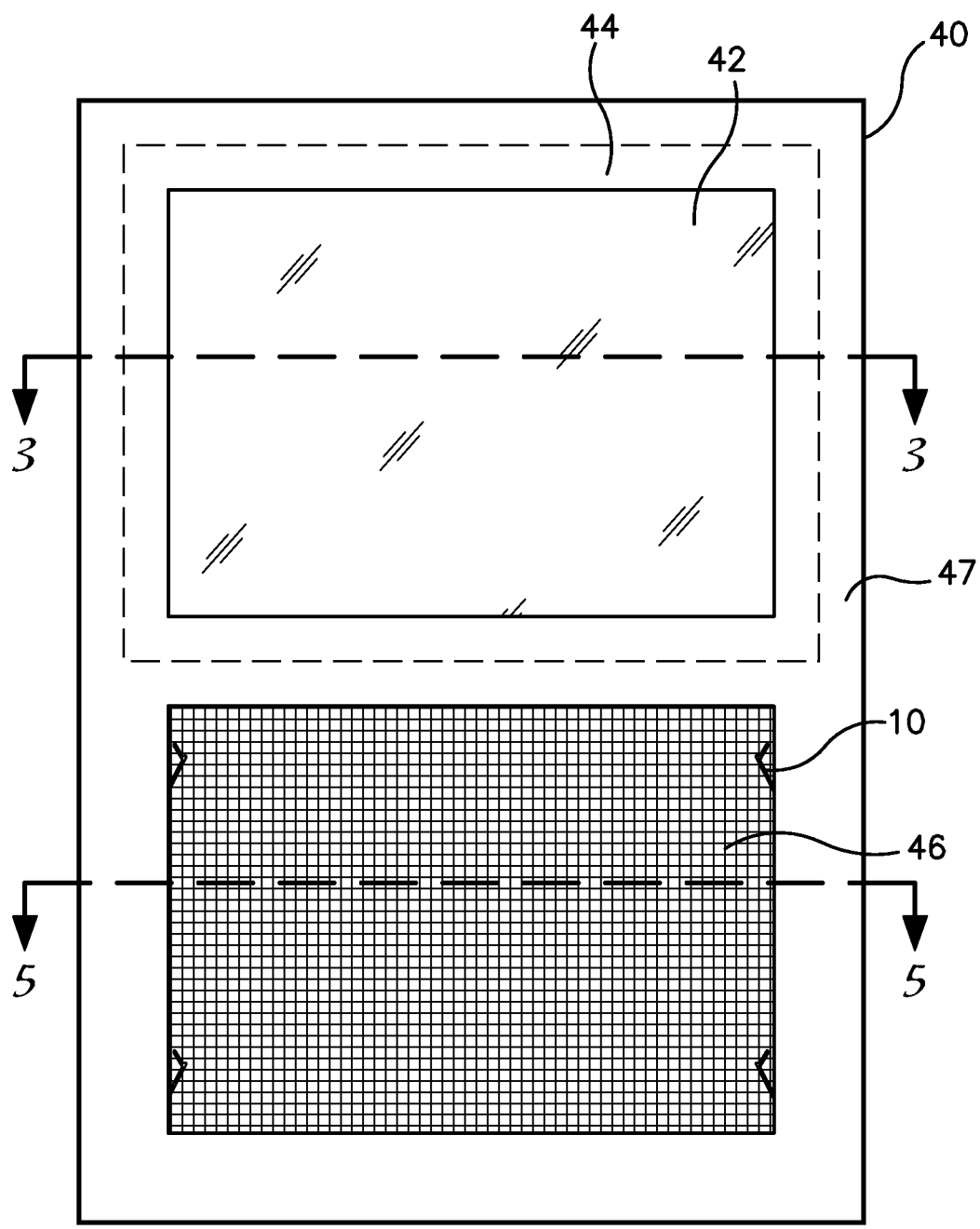
FIG. 2 illustrates an elevation view of a single hung window assembly.
Figure 3:
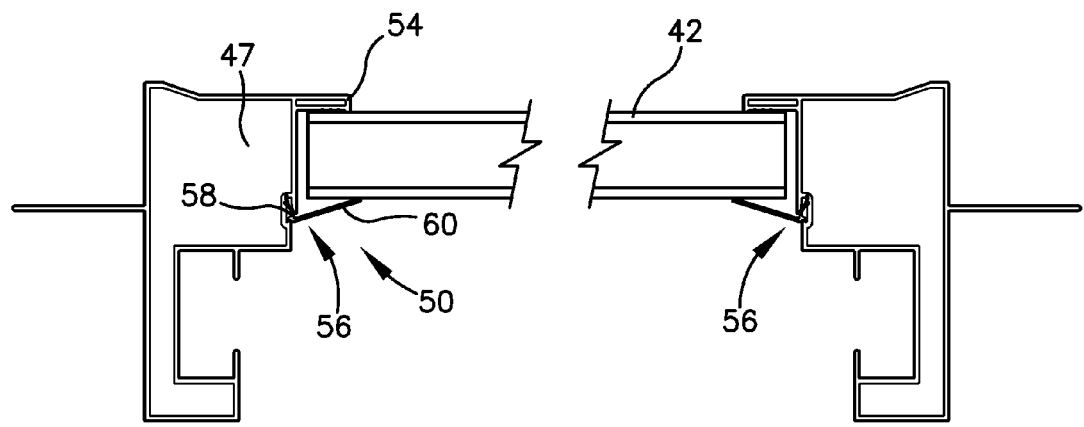
FIG. 3 illustrates a sectional view on the line 3-3 of FIG. 2 of the top half of an exemplary single hung window assembly demonstrating how the groove in the frame is used for securing a panel of insulated glass in position using a glazing bead.
Figure 4:
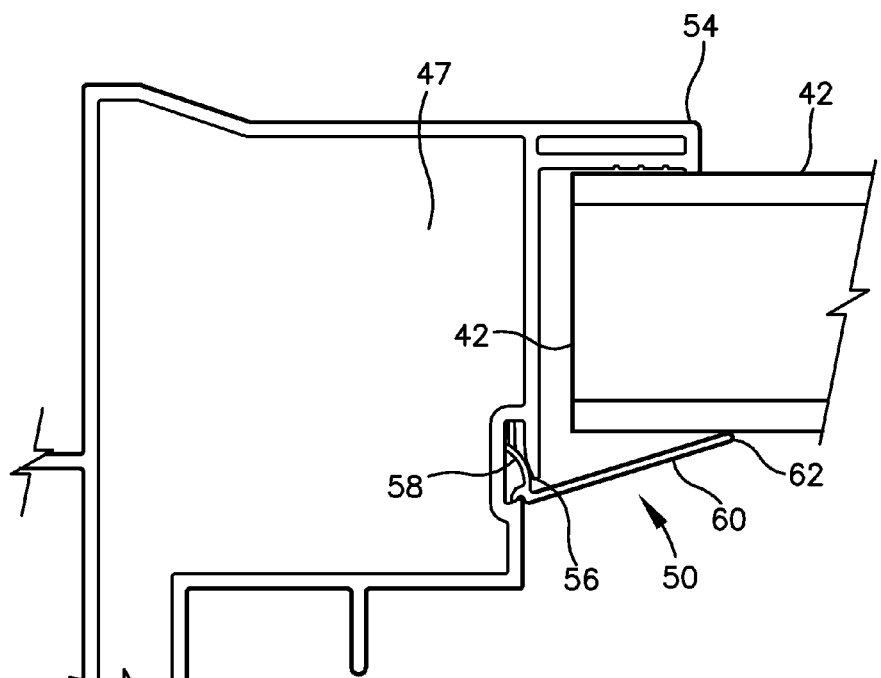
FIG. 4 is close-up view of FIG. 3 illustrating more detail on the configuration of the use of a glazing bead in the frame groove.

FIG. 2 reveals a single hung window 40 with a glass panel 42 in position in the upper portion of the window 40 and glazing beads 44 in position around the glass panel 42 to secure the glass panel in position. The lower portion of the window reveals a screen 46 in position. FIG. 3 is a cutaway view of the frame 47 taken at section 3-3 of FIG. 2 showing the placement of the left portion of the glass panel 42 being secured in position by glazing beads 50 against the frame 47 back panel flange 54. Individual glazing beads 50 circumscribe the glass panel 42 keeping the glass in position. FIG. 4 is an enlarged view of the left portion of FIG. 3 providing an enlarged view of how the first end 56 of the glazing bead 50 snaps into the frame groove 58 and at the second end 60 contacts the glass panel 42 to secure it in position through contact of the glass panel 42 at the end point 62. The frame groove 58 utilized by the glazing bead 50 is central to the operation of the disclosed screen clip 10 to be discussed below.

Figure 5:
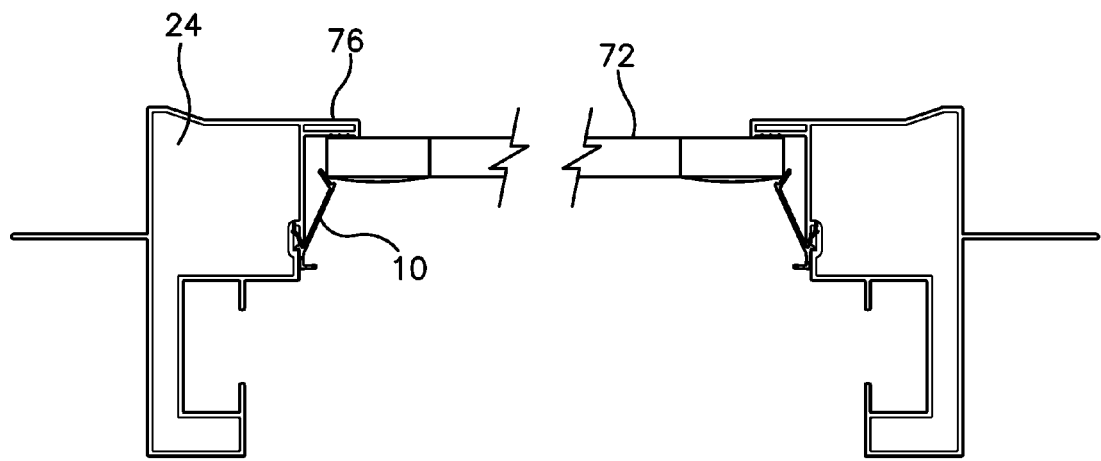
FIG. 5 is a sectional view on the line 5-5 of FIG. 1 of the lower half of a single hung window assembly revealing an exemplary embodiment of a clip securing a screen window in position using the frame groove.

FIG. 5 is a sectional view of FIG. 2 taken along lines 5-5. The quick release clip 10 is used to secure a screen 72, in position in a frame 74 against a frame flange 76. As best seen in FIG. 6, the quick release clip 10 comprises a body member 12 with first and second ends 12A, 12B that is bent back to form an arm member 30 with a front face 31 and an arm pocket 34 and a protrusion 32. The corner edge 78 of the screen 72 is held in position in the arm pocket 34 and the screen is placed under a load due to the compressive effects of front face 31 the clip 10 pushing against the screen 72. The screen edge cannot traverse past the arm pocket because of the protrusion 32 that is located at the junction of the arm member 30 and the body member 12. The height of the protrusion is preferably in the range of from 0.025 to 0.050 inches while the arm member 30 itself is nominally about 0.25 inches in length.

As best seen in FIG. 6, the screen clip 10 is secured into the frame groove 58 by first inserting the linear tab 26 followed by the arcuate main portion 20 into the opening 80 in the frame groove. The flange pocket 29 is then positioned against the first edge 25 of the frame groove 58 and the junction pocket 24 is positioned against the second edge 27 of the frame groove thereby flexibly securing the screen clip 10 into position.

Figure 7:
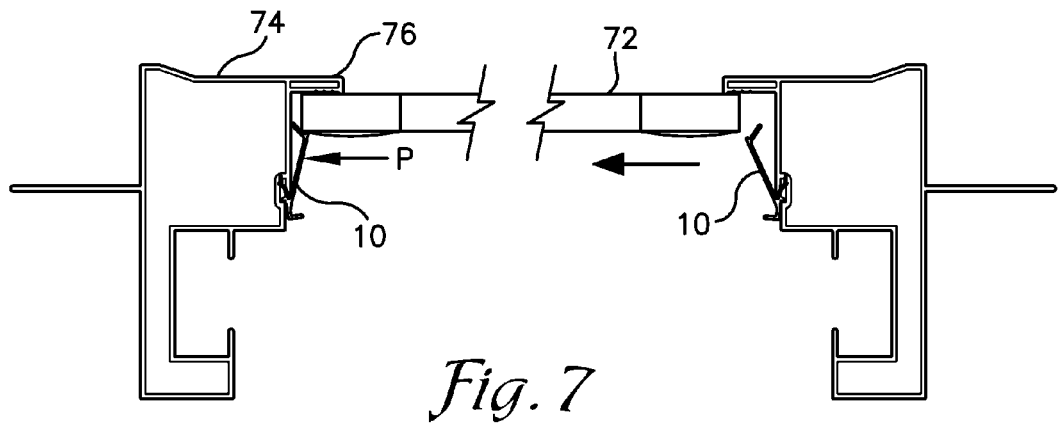
FIG. 7 is a cross sectional view of a window assembly detailing the start of the process of removing an exemplary embodiment of clips from securing the screen in position.

FIGS. 7-10 reveal the steps involved in removing a screen 72 secured in position with the quick release clips 70. The installation process is simply the reverse of the process that is to be described. FIG. 7 details the application of finger or thumb pressure 'P' to the left clip 10 body member 12 thereby relieving pressure applied by the right side clip and allowing the screen to traverse left and begin departure from the window frame 74 against which pressure was previously being applied by the front face 31 of the arm member 30.

Figure 8:
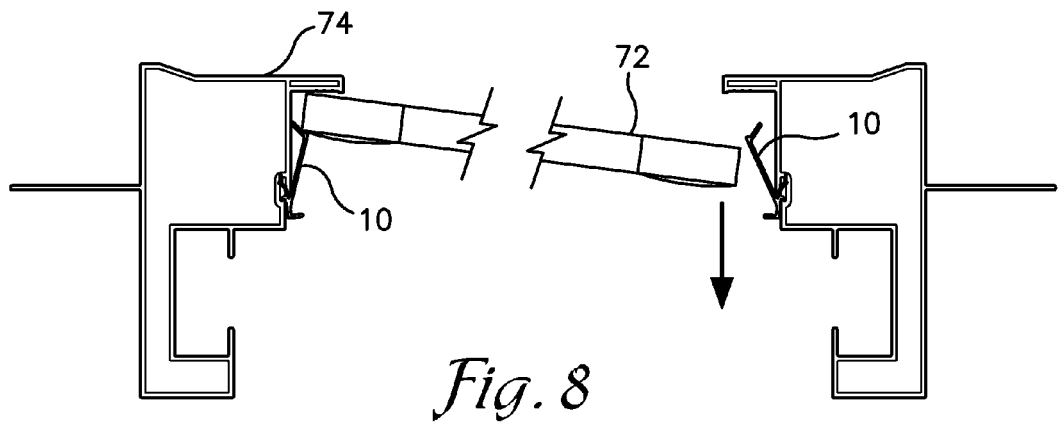
FIG. 8 is a cross sectional view of a window assembly detailing the right side release of an exemplary embodiment of a clip and the start of the removal of the screen.
Figure 9:
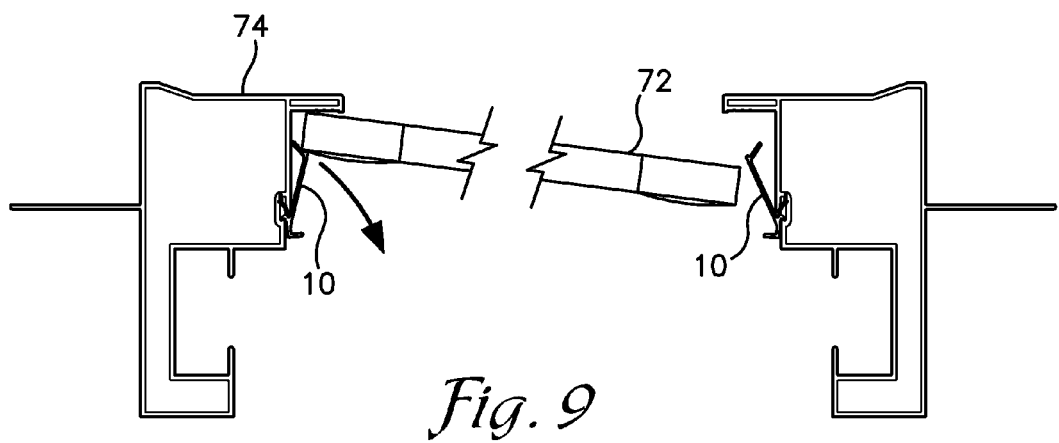
FIG. 9 is a cross sectional view of a window assembly detailing the commencement of the release of the left side of the screen.
Figure 10:
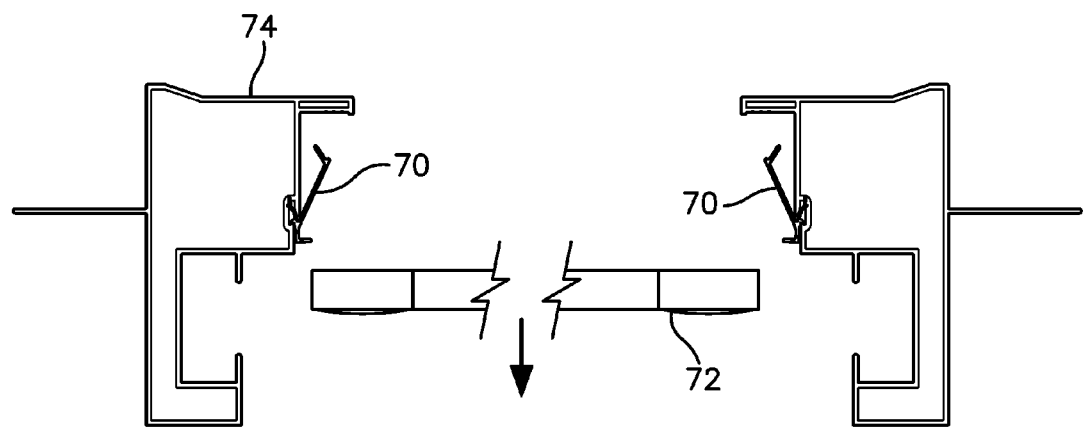
FIG. 10 is a cross sectional view of a window assembly detailing the total release of the screen from the frame following release of the clips.
Figure 11:
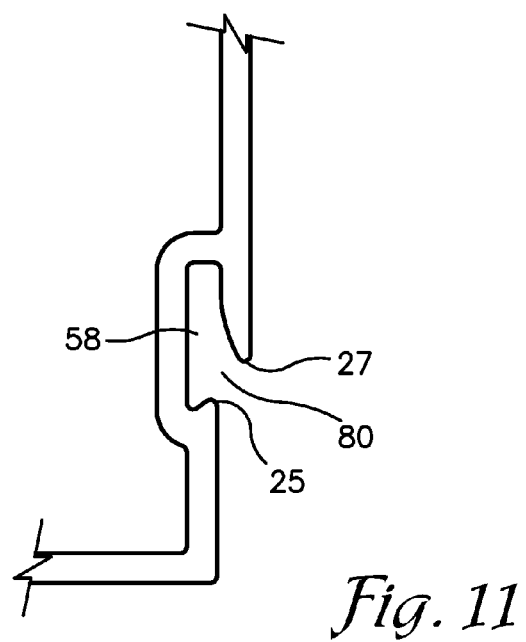
FIG. 11 is an exemplary embodiment of a frame groove of a window.

FIG. 8 details the right side of the screen being extricated from the clip 10. FIG. 9 details how the screen on the left side is no longer under pressure from the clip 10 and can also begin to be extricated from the various points that previously secured it in position. Finally, FIG. 10 details the screen 70 fully extricated from the clips 24 and the frame assembly 28 which previously secured it in position.

In the foregoing specification, the invention has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A system for quick release and insertion of a framed screen into a window frame, the system comprising:
   at least one clip member with a main body member with a first end, a second end and a junction proximate the first end;
   a locking feature further comprising an arcuate main portion extending outwardly from the junction forming a flange pocket and a junction pocket;
   a leg member extending outwardly from the main body member at the junction;
   an arm member extending outwardly from the second end of the main body member; and a window frame with a frame groove, wherein the frame groove further comprises a frame groove opening with a first edge and a second edge, wherein when the locking feature of the at least one clip member is inserted into the opening of the frame groove the first edge of the frame groove is disposed within the flange pocket and the second edge of the frame groove is disposed within the junction pocket and the arm member applies pressure against the frame of the screen.

2. The quick release clip system of claim 1, wherein a hook flange extends downwardly toward the leg member.

3. The quick release clip system of claim 1, wherein the frame of the screen includes a first edge that circumscribes the screen and the arm member engages the first edge securing the screen in position.

4. The quick release clip system of claim 1, wherein the main body member is capable of flexing at least 30 degrees in the direction of the locking feature without fracturing.

5. The quick release clip system of claim 1, wherein the arm member is canted at an angle in the range of from 50 to 70 degrees from the plane of the main body member.

6. The quick release clip system of claim 1, wherein at least two oppositely disposed clip members secure the screen in position in the frame.

\* \* \* \* \*